US006975247B2

(12) United States Patent
Kimmet

(10) Patent No.: US 6,975,247 B2
(45) Date of Patent: *Dec. 13, 2005

(54) ENTITY CATASTROPHIC SECURITY SYSTEM AND METHOD

(76) Inventor: Stephen G. Kimmet, 118 Gross St., Tiffin, OH (US) 44883

( * ) Notice: Subject to any disclaimer, the term of this patent is extended or adjusted under 35 U.S.C. 154(b) by 155 days.

This patent is subject to a terminal disclaimer.

(21) Appl. No.: 10/236,740

(22) Filed: Sep. 7, 2002

(65) Prior Publication Data

US 2003/0058102 A1 Mar. 27, 2003

Related U.S. Application Data

(60) Provisional application No. 60/324,706, filed on Sep. 25, 2001, provisional application No. 60/352,192, filed on Jan. 26, 2002.

(51) Int. Cl.[7] .............................................. G08B 21/00
(52) U.S. Cl. ...................... 340/945; 340/506; 340/531; 340/539.1; 340/825.36; 340/825.72; 701/3; 701/14; 701/29; 701/35
(58) Field of Search ................................ 340/945, 506, 340/531, 539, 825.72, 825.36, 426.24, 539.1, 340/573.1, 574; 701/14, 29, 35, 2, 3

(56) References Cited

U.S. PATENT DOCUMENTS

| | | | | |
|---|---|---|---|---|
| 5,144,661 A | * | 9/1992 | Shamosh et al. | 340/540 |
| 5,438,610 A | * | 8/1995 | Bhagat et al. | 340/825.44 |
| 5,974,349 A | * | 10/1999 | Levine | 701/29 |
| 6,246,320 B1 | * | 6/2001 | Monroe | 340/945 |
| 6,348,866 B1 | * | 2/2002 | Arroyo Lopez | 340/573.1 |
| 6,385,513 B1 | * | 5/2002 | Murray et al. | 340/945 |
| 2003/0128122 A1 | * | 7/2003 | Reynolds | |

* cited by examiner

Primary Examiner—Hung Nguyen

(57) ABSTRACT

An entity catastrophic security system is provided to prevent criminal, human error or major entity failures from causing major catastrophic results. The system employs entity danger signal personnel and devices to generate danger signals, a complex code scheme to assure security of signals, entity processing devices to sense the danger signals, to place the entity into a controlled, restricted state, to signal external processing devices and authorized personnel of the dangerous entity conditions, and to inform national and local authorities of the entity's condition. Even without danger signals from the entity, the external authorized personnel may deem to take over control of the entity. In either case, by way of an entity control device, the entity catastrophic security system also remotely, controllably operates the entity from the external processing device, so as to enforce safe disposition of the entity.

26 Claims, 1 Drawing Sheet

ENTITY CATASTROPHIC SECURITY SYSTEM AND METHOD

RELATED APPLICATIONS

This application claims the benefit of U.S. Provisional Patent Applications Ser. No. 60/324,706, filed Sep. 25, 2001 and Ser. No. 60/352,192, filed Jan. 26, 2002, and U.S. Utility patent application Ser. No. 10/002,660, filed Oct. 23, 2001, which applications are incorporated herein in their entirety.

BACKGROUND OF THE INVENTION

The present invention relates to an entity catastrophic security system, wherein means are provided for detecting the presence of a potential entity catastrophic event. More particularly, the present invention relates to detecting a potential entity catastrophic event, placing the entity in a controlled, restricted state and then transmitting data associated with the event to an external processing unit. Most particularly, the present invention relates to detecting and initially minimizing adverse effects of a potential entity catastrophic event, placing the entity into a controlled, restricted state, transmitting data associate with the event to an external processor, wherein the processor stores the data received, to remotely controllably operate the entity, informs national and local authorities of the occurrence, and enforces safe disposition of the entity.

An entity is an object that can move or be negatively disposed from its normal state, be caused to move or caused to be negatively disposed from its normal state, or be caused to stay at rest or not be positively disposed from its normal state, which can result in experiencing catastrophic conditions or be used to cause catastrophic conditions, for example, to humans, animals, the environment, government, space, and law and order. Some examples of entities are humans, animals, spacecraft of all sorts, aircraft of all sorts, land based vehicles, buildings, watercraft of all sorts, submarines, internal-to-the-earth vehicles, objects that can flow through man or animals, biological weapons, poisons, conventional weapons, and nuclear and atomic weapons of mass destruction.

Currently, criminals, human error, or defects in or associated with an entity are taking over the entity and personally moving the entity as destructive forces into people, buildings, and other entities or the entity is criminalized to cause harm to mail systems, humans, animals, buildings, government, or possibly peace and order. This results in enormous loss of life, disruption of government, and loss of property. Typically, the criminals, human errors, or defects will physically harm personnel associated with the entities and then take full control of the entity, because there is no control function to stop them from immediately taking over the entity.

If the entity experiences a major malfunction, the results can be just as catastrophic as external forces associated with the entity. Some of the sources of major entity functional problems can be the result of the malfunction of the entity, improper maintenance, adverse environmental conditions, improper handling of the entity, terror being applied to the entity, and an explosion or contamination on, near, and/or within the entity.

If criminals, human error, or defects get control of the entity they can virtually move or dispose the entity where and how they desire, while national defenses, the environment, and/or other entities may need to destroy the entity. This can have catastrophic results and cause severe problems near or within the entity. There also are cases where an entity may not be functioning properly or may not be traversing properly yet the improper conditions are not obvious near or within the entity.

In some of these cases communications with the entity are not good and external control cannot be gained, but the consequences of such movement or negative disposition of or to the entity may also be catastrophic.

Monitoring systems that currently exist only apply to individual portions of some of the potential sources of entity problems, they do not place the entity into an immediate controlled, restricted state, and those systems are not linked to provide immediate national and local awareness of the potential for catastrophe. Thus, those skilled in the art continued to seek a solution to the problem of how to provide a better entity catastrophic security system.

SUMMARY OF THE INVENTION

To solve the aforementioned problems, the present invention provides a system that counteracts the sources of dangerous entity problems. The present invention allows, among others, the staff, security personnel, entity detectors, and various entity control functions to signal that a dangerous condition exists. An entity processing device(s), which may be located within, near, or external to the entity, can be made to continuously monitor for detecting these signals, to identify the source of the signals, may alert the staff, alert external processing devices and external authorized personnel, and place the entity into a controlled, restricted state. Upon receiving the dangerous condition signal, the external authorized personnel make plans to determine the source of the problem, the entity's coordinates, heading, elevation, possible planned destinations, and its potential impact on life, government, and property.

In special cases where an entity is not aware of its improper functioning or moving pattern or the entity cannot be communicated with, then the external authorized personnel may decide to take control of the entity. At that point, if it is possible and desired, external processing devices and authorized personnel may communicate with entity staff or crew members, if they exist, to determine the conditions that the entity staff or crew is operating under and to get their input on the dangerous condition's source and to determine what, if any, limited control that might be returned to the entity. If conditions warrant, the external authorized personnel then determine where and when the entity will be safely disposed. Following the receipt of the dangerous signal from, nearby, or external to the entity, the entity processing device would inform national and local authorities of the conditions, so as to help in properly and safely handling the disposition of the entity.

Further objects and advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENT

Figure 1:
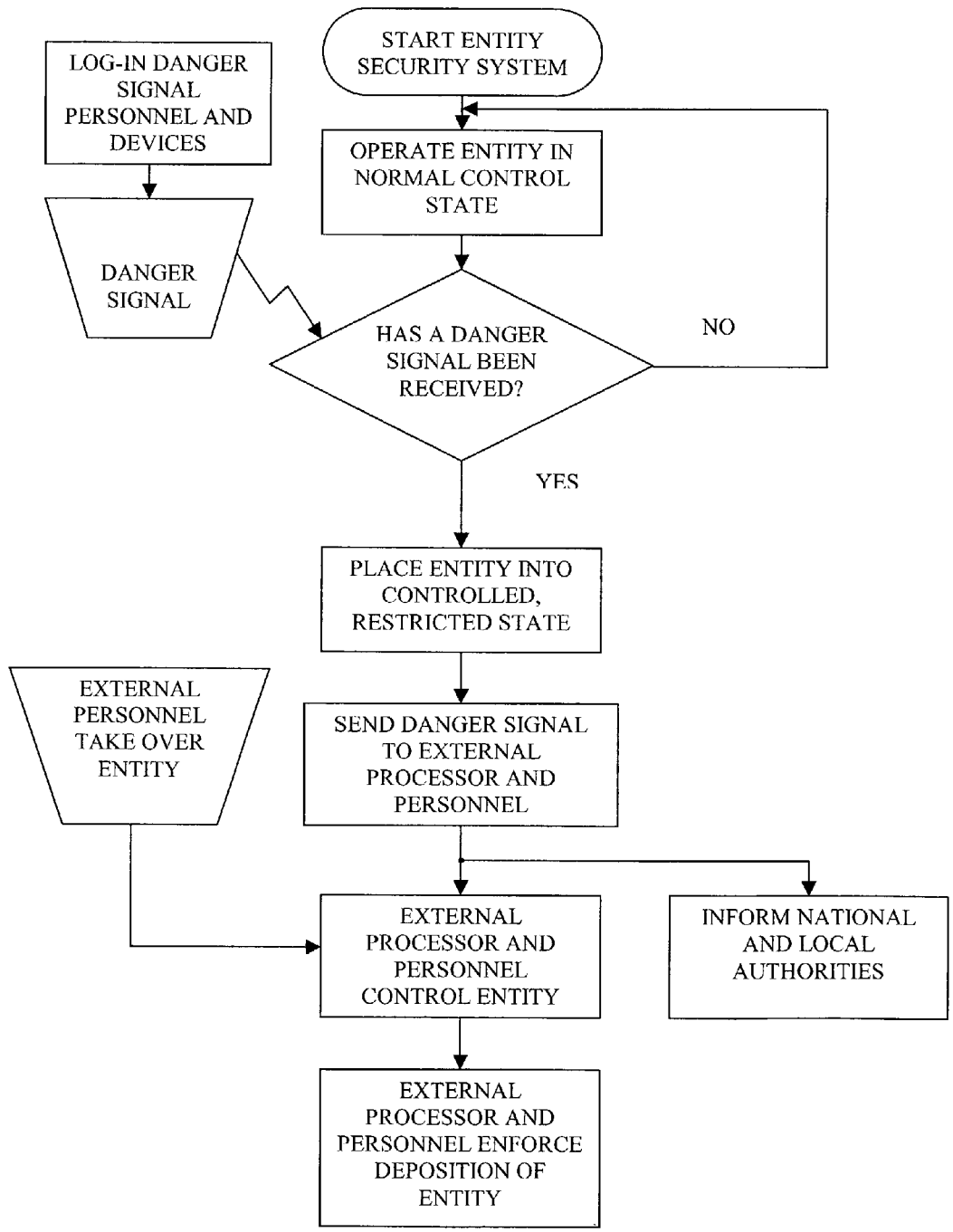
FIG. 1 is a flow chart of the logic that the entity catastrophic security system operates under, in accordance with the present invention.

Referring to FIG. 1, there is illustrated an entity catastrophic security system flow chart of the process that embodies the invention. The entity catastrophic security system monitors and controls the operating state that the entity is working under, at any given point in time. Initially, the entity is set to be operated in a normal state. If, however, the entity has been placed into a controlled, restricted operating state, then merely resetting the entity, will not allow a controlled, restricted state condition to be set back to the normal state. The controlled, restricted operating state will be retained in the entity catastrophic security system even upon a total entity system shutdown. Under the controlled, restricted operating state, only a control signal directed by external authorized personnel can clear the controlled, restricted state or return limited control to the entity.

To start off the process, an entity is placed into the normal state of operation, where the entity will be allowed to be controlled by authorized personnel, in much the same manner that it would be controlled, if it did not use this system.

Authorized danger signal personnel might be entity attendants, plain clothes security officers, entity operators, and others, who may be located within, near, or external to the entity. Security officers would not necessarily be known by the staff of the entity and the security officers would not necessarily be highly trained but could act only as observers of dangerous situations. Using entity danger signal devices, the staff and security personnel sign-on to the entity and sign-in to an entity processing device, which may be located within, near, or external to the entity, so that the system would be aware of which danger signal devices and personnel were near or within the entity. The personnel capable of signaling danger could sign-in through a danger signal device, like a beeper, cell phone, or other wired or wireless device.

Examples of entities would be, but not limited to: buildings, medical centers and hospitals, post offices, crowds, water treatment plants, chemical refineries, pipelines, power generating facilities, biological masses, bodies of water, spacecraft, ships at sea or in a harbor, airport ticket counter, baggage, and loading areas, aircraft pilots, flight attendants, maintenance crews on boats, aircraft, submarines, land, air, sea, and space military and contractors, government and private nuclear and conventional weapons emergency vehicles and locations, bio-weapons sites, schools, the White House and cabinet, aircraft dispatching and traffic controlling sites, military bases and NORAD sites and equipment, and Congress.

Examples of, but not limited to, entity personnel, staff, and equipment detectors would be: pilots, flight attendants, maintenance crews on watercraft, aircraft, submarines, land, air, sea, and in space, military and contractors, government and private nuclear and conventional weapons soldiers, staff, and personnel, emergency workers, firemen, police, hospital doctors, nurses, and staff, bio-weapons experts, teachers, White House staff and cabinet members, aircraft dispatchers and traffic controllers, NORAD staff, and Congress and staffers.

Beyond the human means to present a danger signal, certain entity functions would be designated as critical and sensors would communicate dangerous conditions as well. Examples of this might be, but not limited to, a breakdown of security in an airport terminal, the presence of plastic explosives and weapons, entity blood pressure, temperature, lung operations, operating failures, hydraulic failures, electrical failures, mechanical failures, air pressure, chemical failures, presence of biological warfare material, presence of explosives and poisons, and oxygen failures, heat, contamination of water, oil, gas, and environmental conditions, like fire, pollutants, UV intensity, meson intensity from outer space, proximity of asteroids, and dangerous cosmic conditions.

Danger signal personnel and equipment codes, like passwords and answers to personal questions that only the specific danger signal personnel and equipment would know would be an important part of the entity catastrophic security system, so that secure usage of the danger signal devices would be accomplished. Danger signal devices would be able to verify these passwords and answers and would pass this information on to the entity processing device and the external processing device in a complex code scheme, where requests would be made from the entity processing device and the external processing device in possibly a totally random manner so that there would be enormous unpredictability associated with the request for the codes, like passwords and answers to the personal or equipment based or current operational questions. These precautionary measures would be prevalent in danger signal input functions in the system, especially after a danger signal would be actuated and the external authorized personnel would be verifying subsequent conditions in the entity. If any of the danger signal personnel that the entity catastrophic security system knows to be near, on, or within, does not properly respond to the external authorized personnel after a danger signal has been transmitted, then the entity catastrophic security system may suspect the highest form of danger and acts appropriately thereafter.

Also, as part of the complex code scheme, the danger signal personnel and equipment, who are the only ones to know the answers to requests for passwords and the questions being asked would be required to use great memorization for many possible codes and answers. Much training may be required of the danger signal personnel and equipment, to develop their own unique passwords, possibly founded on mathematics, culture, language, equipment's unique characteristics, and other unpredictable circumstances.

In the complex code scheme, answers to questions that danger signal personnel and equipment would only have knowledge of would be used in such a way that any criminals, human errors, or defects would not easily be able to get those passwords, answers, and conditions, and would have to patiently spend great amounts of time during the entity operations, in an attempt to obtain the codes. By having the possibility of unknown security personnel near or within the entity, a criminal, human error, or defect would not easily know who might have the ability of causing the entity to be placed into a dangerous signal state.

One of the possible danger signal devices might be a commotion sensor that would pick up extreme emotional signals from the entity personnel and staff or it could be a body sensor that is monitoring multiple outputs and conditions that a defect could not gain control of. It is also possible that many entity personnel and devices, who have reputable and trustworthy backgrounds, could be trained to input danger signals so that criminals or defects would need to contend with countless and unpredictable possibilities. This would help to build and maintain the public confidence in the entity system in a country, the world, within the waters, within the earth, within a home, within a hospital, or in outer space.

Staff members and equipment, which could be medical, military, transportation members, law and order, religious, educational, and many venues, would be given the quickest and easiest means to signal danger. They would be the best trained in the passwords and questions that they only know the answers to.

Depending on the circumstances, feedback to the staff of the status of danger signals may or may not be relayed or may be modified as it would be deemed necessary by external authorized personnel. An entity control device is required for controllably operating the entity, where the external authorized personnel, by use of the external processing device, would completely control the entity, or it might be used in a wait-and-see mode, where full control is left in the hands of the entity operators, if any, or the entity could operate somewhere in between these possibilities.

Cameras and/or detectors near or within the entity may be used to determine if criminal or catastrophic activity is taking place, where the video, audio, or detector signals are transmitted to the external authorized personnel. The entity compartments where the staff could be housed or entity functions may need to be locked and highly protected against general entry and terror or defect attack.

The status of the doors, like open, closed, broken, and ajar or in the case of defects, the defective conditions, or detector signals that are out of the expected ranges, for example, pressure, voltage, air speed, current, compartment particulates, red blood cell count, pulse rate, temperature, UV intensity, Geiger counter values, angle of decent for space craft, would be examples of signals that external authorized personnel would be knowledgeable of in the entity catastrophic security system, by way of the external processing device.

If an entity is placed into a controlled, restricted state, which could be manual, wired, wireless, optical, or by causing the entity to move, diverted, or not moved, the state may be to allow only minor adjustment to the entity controls or the state may be as simple as forcing the entity to stay at a certain coordinate or in a certain conditional state, until the danger signal has been analyzed and action brought to properly dispose of the entity. However, before significant control is returned to the entity, following a danger signal, all danger signal personnel and devices may be forced to be in contact with external authorized personnel.

No matter what state of control that is returned to the entity, an entity that has sent even just one accidental danger signal could be dealt with seriously and control may not be fully returned to the entity, and the entity may not be allowed to get near or within predetermined high risk sites. Regarding destinations for an entity that has had a danger signal alarm, the destination may be guarded as though the worst scenario could happen. New destinations could be built across a nation; a hospital, a prison, or the world, so as to coordinate the disposition of the danger signal alarm and consequently the entity in question. For security reasons these destination location coordinates do not have to be normal destinations and could be located in less populated areas with fewer people, with no governmental, populous, economic, or environmental strategic sites nearby, and have less property or people to be affected.

If at any time, the external authorized personnel feel that it is necessary to control an entity, they may not need a danger signal from personnel or entity internal functions to place the entity into a controlled, restricted state. This can be done if the necessity should arise.

If an entity is not placed in a controlled, restricted state throughout its operation, then the operation is not impeded and danger signal personnel and internal entity functions may need to report a successful completion of the entity. If, however, for any reason an entity is placed in a controlled, restricted state, then all danger signal personnel and entity internal functions may be forced to be returned to a safe state or the entity remains in the controlled, restricted state.

In accordance with the provisions of the patent statutes, the principles and modes of operation of this invention have been explained and illustrated in its preferred embodiments. However, it must be understood that this invention may be practiced otherwise than as specifically explained and illustrated without departing from its spirit or scope.

What is claimed is:

1. A catastrophic security system for an entity, comprising:
    a) at least one entity danger signal device transmitting a plurality of danger signals, and receiving and transmitting a plurality of danger signal personnel codes or receiving and transmitting a plurality of danger signal device codes;
    b) an entity control device controllably operating said entity and being controlled externally, remotely for controllably operating said entity;
    c) an entity processing device receiving said danger signals from a plurality of danger signal devices and receiving and transmitting said danger signal personnel codes from and to a plurality of danger signal personnel and transmitting and receiving said danger signal device codes from and to said plurality of danger signal devices and transmitting and receiving control state conditions information and operating said entity control device and transmitting said control state conditions information to national and local authorities; and
    d) an external processing device transmitting and receiving said entity control state conditions information to and from a plurality of entity processing devices and transmitting and receiving said entity control state conditions information to and from a plurality of entity control devices and transmitting and receiving a plurality of entity operating commands to and from said plurality of entity processing devices and transmitting and receiving entity operating commands to and from said plurality of entity control devices.

2. A method of operating a catastrophic security system for an entity, comprising:
    a) placing said entity into normal operating mode by an external processing device;
    b) logging danger signal personnel of said entity, through the use of danger signal personnel codes, by an entity processing device;
    c) logging danger signal devices of said entity, through the use of danger signal device codes, by said entity processing device;
    d) monitoring danger signals of said entity by said entity processing device;
    e) placing an entity control device in a controlled, restricted operating mode upon receipt of said danger signal by said entity processing device;
    f) transmitting said danger signal to said external processing device by said entity processing device;
    g) informing national and local authorities of said danger signal by said entity processing device;
    h) controlling said entity control device by said, external processing device; and
    i) disposing of said entity by said external processing device.

3. A catastrophic security system for an entity, comprising:
   a) at least one entity danger signal device;
   b) at least one entity control device; and
   c) at least one external processing device;
   d) wherein a signal from said signal device or from said external device causes national authorities to be informed and causes said control device to remotely control said entity by placing said entity into a controlled, restricted operating state.

4. The security system of claim 3, wherein said entity comprises a watercraft.

5. The security system of claim 3, wherein said entity comprises a spacecraft.

6. The security system of claim 3, wherein said entity comprises an aircraft.

7. The security system of claim 3, wherein said entity comprises a human.

8. The security system of claim 3, wherein said entity comprises a land based vehicle.

9. The security system of claim 3, wherein said entity comprises a poison.

10. The security system of claim 3, wherein said entity comprises a conventional weapon.

11. The security system of claim 3, wherein said entity comprises a nuclear weapon.

12. The security system of claim 3, wherein said entity comprises a building.

13. The security system of claim 3, wherein said entity comprises a water treatment plant.

14. The security system of claim 3, wherein said entity comprises a chemical refinery.

15. A method of operating a catastrophic security system for an entity, comprising:
   a) monitoring for a signal from a danger signal device or from an external processing device;
   b) remotely controlling said entity upon receipt of said signal by placing said entity into a controlled, restricted operating state; and
   c) informing national authorities.

16. The method of claim 15, wherein said entity comprises a watercraft.

17. The method of claim 15, wherein said entity comprises a spacecraft.

18. The method of claim 15, wherein said entity comprises an aircraft.

19. The method of claim 15, wherein said entity comprises a human.

20. The method of claim 15, wherein said entity comprises a land base vehicle.

21. The method of claim 15, wherein said entity comprises a poison.

22. The method of claim 15, wherein said entity comprises a conventional weapon.

23. The method of claim 15, wherein said entity comprises a nuclear weapon.

24. The method of claim 15, wherein said entity comprises a building.

25. The method of claim 15, wherein said entity comprises a water treatment plant.

26. The method of claim 15, wherein said entity comprises a chemical refinery.

* * * * *